US008168710B2

(12) United States Patent
Rajagopalan et al.

(10) Patent No.: US 8,168,710 B2
(45) Date of Patent: May 1, 2012

(54) GOLF BALLS CONTAINING HIGHLY-NEUTRALIZED ACID POLYMER BLENDS

(75) Inventors: Murali Rajagopalan, South Dartmouth, MA (US); Michael J. Sullivan, Barrington, RI (US); Kevin M. Harris, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 403 days.

(21) Appl. No.: 12/475,922

(22) Filed: Jun. 1, 2009

(65) Prior Publication Data

US 2009/0247323 A1 Oct. 1, 2009

Related U.S. Application Data

(63) Continuation-in-part of application No. 11/761,596, filed on Jun. 12, 2007, now abandoned, which is a continuation of application No. 10/959,751, filed on Oct. 6, 2004, now Pat. No. 7,230,045, which is a continuation-in-part of application No. 10/360,233, filed on Feb. 6, 2003, now Pat. No. 6,939,907, which is a continuation-in-part of application No. 10/118,719, filed on Apr. 9, 2002, now Pat. No. 6,756,436.

(60) Provisional application No. 60/301,046, filed on Jun. 26, 2001.

(51) Int. Cl.

| | |
|---|---|
| ***A63B 37/12*** | (2006.01) |
| ***A63B 37/00*** | (2006.01) |
| ***C08L 33/02*** | (2006.01) |
| ***C08L 23/00*** | (2006.01) |

(52) U.S. Cl. ........ 524/322; 524/394; 524/397; 524/399; 524/400; 525/71; 525/72; 525/74; 525/93; 525/196; 525/221; 473/373; 473/385

(58) Field of Classification Search ........................ None
See application file for complete search history.

(56) References Cited

U.S. PATENT DOCUMENTS

| | | | | |
|---|---|---|---|---|
| 5,306,760 | A | 4/1994 | Sullivan | |
| 5,312,857 | A | 5/1994 | Sullivan | |
| 5,688,191 | A | 11/1997 | Cavallaro et al. | |
| 5,703,166 | A * | 12/1997 | Rajagopalan et al. | 525/196 |
| 5,789,475 | A | 8/1998 | Chen | |
| 5,803,831 | A | 9/1998 | Sullivan et al. | |
| 5,902,855 | A | 5/1999 | Sullivan | |
| 5,973,046 | A | 10/1999 | Chen et al. | |
| 5,981,658 | A * | 11/1999 | Rajagopalan et al. | 525/72 |
| 6,057,403 | A | 5/2000 | Sullivan et al. | |
| 6,083,119 | A | 7/2000 | Sullivan et al. | |
| 6,100,321 | A | 8/2000 | Chen | |
| 6,329,458 | B1 | 12/2001 | Takesue et al. | |
| 6,562,906 | B2 | 5/2003 | Chen | |
| 6,565,455 | B2 | 5/2003 | Hayashi et al. | |
| 6,565,456 | B2 | 5/2003 | Hayashi et al. | |
| 6,592,470 | B2 | 7/2003 | Watanabe et al. | |
| 6,624,221 | B2 | 9/2003 | Takesue et al. | |
| 6,653,382 | B1 | 11/2003 | Statz et al. | |
| 6,723,008 | B2 | 4/2004 | Higuchi et al. | |
| 6,746,345 | B2 | 6/2004 | Higuchi et al. | |
| 6,756,436 | B2 | 6/2004 | Rajagopalan et al. | |
| 6,815,480 | B2 | 11/2004 | Statz et al. | |
| 6,824,477 | B2 | 11/2004 | Rajagopalan et al. | |
| 6,838,501 | B2 | 1/2005 | Takesue et al. | |
| 6,894,097 | B2 | 5/2005 | Takesue et al. | |
| 6,894,098 | B2 | 5/2005 | Rajagopalan et al. | |
| 6,939,907 | B2 | 9/2005 | Rajagopalan et al. | |
| 6,962,951 | B1 * | 11/2005 | Takesue et al. | 524/322 |
| 7,230,045 | B2 * | 6/2007 | Rajagopalan et al. | 524/322 |
| 2006/0189733 | A1 * | 8/2006 | Kennedy et al. | 524/322 |

FOREIGN PATENT DOCUMENTS

| | | |
|---|---|---|
| WO | WO00/23519 | 4/2000 |
| WO | WO01/29129 A1 | 4/2001 |

OTHER PUBLICATIONS

Thain; Science and Golf IV;Jul. 2002; pp. 319-327.*

* cited by examiner

*Primary Examiner* — David Buttner
(74) *Attorney, Agent, or Firm* — William B. Lacy

(57) ABSTRACT

A golf ball having a core, a cover layer, and an optional intermediate layer disposed between the core and the cover layer is disclosed and described. One or more of the core, the cover layer, or the intermediate layer is formed of a highly neutralized polymer blend of an acid copolymer and a metallocene-catalyzed copolymer, an olefinic block copolymer, a sufficient amount of a suitable cation source and a fatty acid or salt of a fatty acid. The highly neutralized polymer blend is neutralized from 80% to 100% while still retaining processability. Further, the core can have a diameter of 0.5 inches to about 1.62 inches and an Atti compression less than or equal to 105. The cover layer can have a material hardness between about 30 and 70 Shore D.

17 Claims, No Drawings

GOLF BALLS CONTAINING HIGHLY-NEUTRALIZED ACID POLYMER BLENDS

CROSS-REFERENCE TO RELATED APPLICATION

This application is a continuation-in-part of U.S. patent application Ser. No. 11/761,596, filed Jun. 12, 2007, now abandoned, which is a continuation of U.S. patent application Ser. No. 10/959,751, filed Oct. 6, 2004, now U.S. Pat. No. 7,230,045, which is a continuation-in-part of U.S. application Ser. No. 10/360,233, filed Feb. 6, 2003, now U.S. Pat. No. 6,939,907, which is a continuation-in-part of U.S. application Ser. No. 10/118,719, filed Apr. 9, 2002, now U.S. Pat. No. 6,756,436, which claims the benefit of U.S. Provisional Application No. 60/301,046, filed Jun. 26, 2001, each of which being incorporated herein by reference.

FIELD OF THE INVENTION

The present invention is directed to golf ball compositions and, in particular, polymer compositions including highly-neutralized polymer blends containing metallocene-catalyzed copolymers and olefinic block copolymers.

BACKGROUND OF THE INVENTION

Conventional golf balls can be divided into two general classes: solid and wound. Solid golf balls include one-piece, two-piece (i.e., solid core and a cover), and multi-layer (i.e., solid core of one or more layers and/or a cover of one or more layers) golf balls. Wound golf balls typically include a solid, hollow, or fluid-filled center, surrounded by a tensioned elastomeric material, and a cover. It is also possible to surround a hollow or fluid-filled center with a plurality of solid layers. Solid balls have traditionally been considered longer distanced balls that are more durable than wound balls, but many solid constructions lack the "feel" provided by the wound construction.

More recently, by altering ball construction and composition, manufacturers have been able to vary a wide range of playing characteristics, such as compression, velocity, "feel," and spin, optimizing some or all of these characteristics for various playing abilities. In particular, a variety of core and cover layer constructions, such as multi-layer balls having dual cover layers and/or dual core layers, have been investigated and now allow many non-wound balls to exhibit characteristics previously unachievable in a solid-construction golf ball. These golf ball layers are typically constructed with a number of polymeric compositions and blends, including polybutadiene rubber, polyurethanes, polyamides, and ethylene-based ionomers.

Ionomers, and in particular ethylene α,β-ethylenically unsaturated carboxylic acid copolymers or a melt processible ionomer thereof, are a preferred polymer for many golf ball layers. One problem encountered with the use of ionomers as stiff layers, however, is the unprocessability of the material as the percent neutralization of the acid group increases. Ionomers are stiffened by increasing the amount of neutralization by a metal cation or a salt thereof. Once the percent of neutralization is greater than about 60% (depending on metal cation selected), the melt flow of the ionomer becomes too low and the ease of processability decreases or disappears altogether. For tri-valent cations, the percent neutralization at which the polymer becomes unprocessable can be significantly lower. Therefore, options for polymer blends and associated processing remain limited.

SUMMARY OF THE INVENTION

The present invention is directed to a golf ball including a core having a diameter of about 0.5 to 1.62 inches and an Atti compression of about 105 or less; a cover layer having a material hardness from about 30 to 70 Shore D; and an optional intermediate layer disposed between the core and the cover layer. At least one of the core, the cover layer, or the intermediate layer includes a highly-neutralized polymer blend formed from a reaction product of an acid copolymer, a metallocene-catalyzed copolymer, a fatty acid or salt of a fatty acid, and a sufficient amount of a suitable cation source to bring a total neutralized acid content in the acid copolymer to about 80% to 100%. The acid copolymer may be an α-olefin, C3-8 α,β ethylenically unsaturated carboxylic acid or, alternatively, an E/X/Y copolymer where E is ethylene, X is the $C_{3-8}$ α,β-ethylenically unsaturated carboxylic acid, and Y is a softening comonomer. X is, preferably, acrylic acid or methacrylic acid and Y is a $C_{1-8}$ alkyl acrylate or methacrylic ester.

The metallocene-catalyzed copolymer may be a copolymer of ethylene and a second olefin, which is typically propylene, butene, pentene, hexene, heptene, octene, or norbornene. The metallocene-catalyzed copolymer may also be a grafted metallocene-catalyzed copolymer having pendant functional groups, that include maleic, fumaric, acrylic, acrylate, and combinations thereof.

The fatty acid includes caproic acid, caprylic acid, capric acid, lauric acid, stearic acid, behenic acid, erucic acid, oleic acid, linoleic acid, or dimerized derivatives thereof. The fatty acid salt includes magnesium oleate or zinc stearate. The salt of the fatty acid includes a cation, such as barium, lithium, sodium, zinc, bismuth, chromium, cobalt, copper, potassium, strontium, titanium, tungsten, magnesium, cesium, iron, nickel, silver, aluminum, tin, or calcium.

At least one of the core, the cover layer, or the intermediate layer includes the highly-neutralized polymer blend, typically neutralized to about 90% to 100%. In one embodiment, the core includes a base rubber and the intermediate layer is an outer core layer formed from the highly-neutralized polymer blend. In a preferred embodiment, the core comprises the highly neutralized polymer blend. The cover layer may include a castable reactive liquid material, such as a polyurethane, a polyurea, or a copolymer comprising urethane and urea segments. The cover layer may also include an inner cover layer and an outer cover layer.

The present invention is further directed to a golf ball including a core having a diameter of about 0.5 to 1.620 inches and having an Atti compression no greater than about 105; a cover layer having a material hardness between about 30 and 70 Shore D; and an optional intermediate layer disposed between the core and the cover layer. At least one of the core, the cover layer, or the intermediate layer includes a highly-neutralized polymer blend formed from a reaction product of an acid copolymer, a metallocene-catalyzed copolymer, an olefinic block copolymer, a fatty acid or salt of a fatty acid, and a sufficient amount of a suitable cation source to neutralize the total acid content in the acid copolymer to 80% to 100%.

There has thus been outlined, rather broadly, a few features of the invention so that the detailed description thereof that follows may be better understood, and so that the present contribution to the art may be better appreciated. Other features of the present invention will become clearer from the following detailed description of the invention or may be learned by the practice of the teachings herein. Furthermore, this summary is intended to describe the invention broadly with reference to some specific alternative embodiments which include elements that are not required by all of the claims appended hereto.

DETAILED DESCRIPTION OF THE INVENTION

The present invention is directed to highly-neutralized polymers and blends thereof ("HNP") for the use in golf equipment, and particularly in golf ball cores, intermediate layers, and/or covers. The acid moieties of the HNP's, typically ethylene-based ionomers, can be neutralized greater than about 70%, greater than about 90%, or in some cases, about 100%. The HNP's can also be blended with a second polymer component, which, if containing an acid group, may be neutralized in the presence of a sufficient amount a suitable cation source and a suitable organic fatty acids and/or their salts. The second polymer component, which may be partially or fully neutralized, can comprise ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, olefinic block copolymers and the like. HNP polymers typically have a material hardness of between about 20 and about 80 Shore D, preferably 30 to 70 Shore D, more preferably 40 to 68 Shore D and a flexural modulus of between about 3,000 psi and about 200,000 psi, preferably 10,000 to 80,000 psi and more preferably 20,000 to 75,000 psi.

In one embodiment of the present invention the HNP's are ionomers and/or their acid precursors that are neutralized, either fully or partially, in the presence of a sufficient amount of a suitable cation source along with a suitable amount of an organic acid or their salts thereof. The acid copolymers can be $\alpha$-olefin, $C_{3-8}$ $\alpha,\beta$-ethylenically unsaturated carboxylic acid copolymers. Although other materials can be used, the $\alpha$-olefin can typically be ethylene and the $C_{3-8}$ $\alpha,\beta$-ethylenically unsaturated carboxylic acid can be acrylic acid or methacrylic acid. The acid copolymers may optionally contain a softening monomer, such as alkyl acrylate and alkyl methacrylate, wherein the alkyl groups have from 1 to 8 carbon atoms.

In one embodiment, the acid copolymers can be described as E/X/Y copolymers where E is ethylene, X is an $\alpha,\beta$-ethylenically unsaturated carboxylic acid, and Y is a softening comonomer. In another specific embodiment, X can be acrylic or methacrylic acid and Y can be a $C_{1-8}$ alkyl acrylate or methacrylate ester. X can be present in an amount from about 1 to about 35 weight percent of the polymer, such as from about 5 to about 30 weight percent of the polymer, and in some cases, from about 10 to about 20 weight percent of the polymer. Y can be present in an amount from about 0 to about 50 weight percent of the polymer, such as from about 5 to about 25 weight percent of the polymer, and in some cases, from about 10 to about 20 weight percent of the polymer.

Specific acid-containing ethylene copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Particularly effective acid-containing ethylene copolymers include, ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers. In one specific embodiment, the acid-containing ethylene copolymers are, ethylene/(meth) acrylic acid/n-butyl acrylate, ethylene/(meth)acrylic acid/ethyl acrylate, and ethylene/(meth) acrylic acid/methyl acrylate copolymers.

U.S. Publication Nos. 2003/0114565 and 2003/0050373, which are incorporated by reference herein in their entirety, discuss soft, high resilient ionomers, and include additional discussion of neutralizing E/X/Y copolymers as acid copolymers. In these examples, X is present at 2-30 (such as 4-20, or 5-15) wt % of the polymer, and Y is present at 17-40 (such as 20-40, or 24-35) wt % of the polymer. Typically, the melt index (MI) of the base resin is at least 20, or at least 40, and most often, at least 75, and in some cases at least 150. Particular soft, resilient ionomers included in this invention are partially neutralized ethylene/(meth) acrylic acid/butyl (meth)acrylate copolymers having an MI and level of neutralization that results in a melt processible polymer that has useful physical properties. The weight ratio of X to Y in the E/X/Y copolymers is generally at least about 1:20. In one aspect of the present invention, the weight ratio of X to Y is at least about 1:15, or at least about 1:10. Furthermore, the weight ratio of X to Y is up to about 1:1.67, or up to about 1:2. In yet another specific aspect, the weight ratio of X to Y in the composition is up to about 1:2.2.

The acid moiety of the acid copolymer can be neutralized by one or more alkali metal, transition metal, or alkaline earth metal cation(s). Cations useful in making the ionomers of the present invention can comprise lithium, sodium, potassium, magnesium, calcium, barium, or zinc, or a combination of such cations. It has been found that by adding sufficient organic acid or salt of organic acid, along with a suitable base, to the acid copolymer or ionomer, the ionomer can be neutralized without losing processability to a level much greater than for a metal cation. The copolymers can be at least partially neutralized such as at least 40%, at least 55%, in some cases at least about 70%, and in many cases at least 80%. Most often, the acid moieties are neutralized greater than about 80%, such as from 90-100%, and in some cases 100% without losing processability. This can be accomplished by melt-blending an ethylene $\alpha,\beta$-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, and in some cases to 100%.

This invention also relates to a "modified" soft, resilient thermoplastic ionomer that comprises a melt blend of (a) the acid copolymers or the melt processable ionomers made therefrom as described herein and (b) one or more organic acid(s) or salt(s) thereof, wherein greater than 80%, such as greater than 90% of all the acid of (a) and of (b) is neutralized. In many embodiments, 100% of all the acid of (a) and (b) is neutralized by a cation source. An amount of cation source in excess of the amount required to neutralize 100% of the acid in (a) and (b) can be used to neutralize the acid in (a) and (b). Blends with fatty acids or fatty acid salts are also useful.

The organic acids or salts thereof can be added in an amount sufficient to enhance the resilience of the copolymer. Accordingly, the organic acids or salts thereof can be added in an amount sufficient to substantially remove remaining ethylene crystallinity of the copolymer. The organic acids or salts can be added in an amount of at least about 5% (weight basis)

of the total amount of copolymer and organic acid(s). In some embodiments of the present invention, the organic acids or salts thereof are added in an amount of at least about 15%, and in some cases at least about 20%. The organic acid(s) can be added in an amount up to about 50% (weight basis) based on the total amount of copolymer and organic acid. However, is other embodiments, the organic acids or salts thereof are added in an amount of up to about 40%, and in other embodiments, up to about 35%. The non-volatile, non-migratory organic acids can be one or more aliphatic, mono-functional organic acids or salts thereof as described herein, particularly one or more aliphatic, mono-functional, saturated or unsaturated organic acids having less than 36 carbon atoms or salts of the organic acids, such as stearic acid or oleic acid. Fatty acids or fatty acid salts are particularly suitable.

The organic acids of the present invention are aliphatic, mono- or multi-functional (saturated, unsaturated, or multi-unsaturated) organic acids, particularly those having fewer than 36 carbon atoms. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is desirable that the organic acids and salts of the present invention be relatively non-migratory (i.e., they do not bloom to the surface of the polymer under ambient temperatures) and non-volatile (i.e., they do not volatilize at temperatures required for melt-blending). Fatty acids or fatty acid salts are currently particularly suitable. Specific organic acids useful in the present invention can include caproic acid, caprylic acid, capric acid, lauric acid, stearic acid, behenic acid, erucic acid, oleic acid, and linoleic acid.

The ionomers of the invention may also be partially neutralized with metal cations. The acid moiety in the acid copolymer is neutralized about 1 to about 100%, such as at least about 40 to about 100%, and in some cases at least about 90 to about 100%, to form an ionomer by a cation such as lithium, sodium, potassium, magnesium, calcium, barium, lead, tin, zinc, aluminum, or a mixture thereof.

The acid copolymers of the present invention can be prepared from 'direct' acid copolymers, copolymers polymerized by adding all monomers simultaneously, or by grafting of at least one acid-containing monomer onto an existing polymer. The acid copolymers used in the present invention to make the ionomers are typically 'direct' acid copolymers (containing high levels of softening monomers). As noted above, the copolymers are at least partially neutralized, where at least about 40% of X in the composition is neutralized. Often, at least about 55% of X is neutralized. Even more often, at least about 70, and in some cases, at least about 80% of X is neutralized. In the event that the copolymer is highly neutralized (e.g., to at least 45%, such as at least 50%, 55%, 70%, or 80%, of acid moieties), the MI of the acid copolymer should be sufficiently high so that the resulting neutralized resin has a measurable MI in accord with ASTM D-1238, condition E, at 190° C., using a 2160 g weight. Typically, this resulting MI will be at least 0.1, such as at least 0.5, and in some cases 1.0 or greater. For highly neutralized acid copolymer, the MI of the acid copolymer base resin can be at least 20, or at least 40, at least 75, and in some cases at least 150.

As disclosed in the U.S. Pat. No. 6,756,436, the thermoplastic polymer components such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized.

Grafted metallocene-catalyzed polymers are also useful for blending with the HNP's of the present invention. The grafted metallocene-catalyzed polymers, while conventionally neutralized with metal cations, may also be neutralized, either partially for fully, with organic acids or salts thereof and an appropriate base. Grafted metallocene-catalyzed polymers useful, such as those disclosed in U.S. Pat. Nos. 5,703,166; 5,824,746; 5,981,658; and 6,025,442, which are incorporated herein by reference, in the golf balls of the invention are available in experimental quantities from DuPont under the tradenames SURLYN® NMO 525D (SURLYN® NMO 572D), SURLYN® NMO 524D, and SURLYN® NMO 499D, all formerly known as the FUSABOND® family of polymers, or may be obtained by subjecting a non-grafted metallocene-catalyzed polymer to a post-polymerization reaction to provide a grafted metallocene-catalyzed polymer with the desired pendant group or groups. Examples of metallocene-catalyzed polymers to which functional groups may be grafted for use in the invention include, but are not limited to, homopolymers of ethylene and copolymers of ethylene and a second olefin, such as propylene, butene, pentene, hexene, heptene, octene, and norbornene. Generally, the invention includes golf balls having at least one layer comprising at least one grafted metallocene-catalyzed polymer or polymer blend, where the grafted metallocene-catalyzed polymer is produced by grafting a functional group onto a metallocene-catalyzed polymer having the formula:

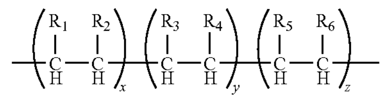

wherein $R_1$ is hydrogen, branched or straight chain alkyl such as methyl, ethyl, propyl, butyl, pentyl, hexyl, heptyl, and octyl, carbocyclic, or aromatic; $R_2$ is hydrogen, lower alkyl including $C_{1-5}$; carbocyclic, or aromatic; $R_3$ is hydrogen, lower alkyl including $C_{1-5}$, carbocyclic, or aromatic; $R_4$ is selected from the group consisting of H, $C_nH_{2n+1}$, where n=1 to 18, and phenyl, in which from 0 to 5H within $R_4$ can be replaced by substituents COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring; $R_5$ is hydrogen, lower alkyl including $C_1$-$C_5$, carbocyclic, or aromatic; $R_6$ is hydrogen, lower alkyl including $C_{1-5}$, carbocyclic, or aromatic; and wherein x, y and z are the relative percentages of each co-monomer. X can range from about 1 to 99 percent, such as from about 10 to about 70 percent, and in some cases from about 10 to 50 percent. Y can be from 99 to 1 percent, such as from 90 to 30 percent, and in some cases 90 to 50 percent. Z can range from about 0 to about 49 percent. One of ordinary skill in the art would understand that if an acid moiety is present as a ligand in the above polymer that it may be neutralized up to 100% with an organic fatty acid as described above.

Metallocene-catalyzed copolymers or terpolymers can be random or block and may be isotactic, syndiotactic, or atactic. The pendant groups creating the isotactic, syndiotactic, or atactic polymers are chosen to determine the interactions between the different polymer chains making up the resin to control the final properties of the resins used in golf ball covers, centers, or intermediate layers. As will be clear to those skilled in the art, grafted metallocene-catalyzed polymers useful in the invention that are formed from metallocene-catalyzed random or block copolymers or terpolymers will also be random or block copolymers or terpolymers, and will have the same tacticity of the metallocene-catalyzed polymer backbone.

As used herein, the term "phrase branched or straight chain alkyl" means any substituted or unsubstituted acyclic carbon-containing compounds. Examples of alkyl groups include lower alkyl, for example, methyl, ethyl, n-propyl, iso-propyl, n-butyl, iso-butyl or t-butyl; upper alkyl, for example, octyl, nonyl, decyl, and the like; and lower alkylene, for example, ethylene, propylene, butylene, pentene, hexene, octene, norbornene, nonene, decene, and the like.

In addition, such alkyl groups may also contain various substituents in which one or more hydrogen atoms have been replaced by a functional group. Functional groups include, but are not limited to hydroxyl, amino, carboxyl, sulfonic amide, ester, ether, phosphates, thiol, nitro, silane and halogen (fluorine, chlorine, bromine and iodine), to mention but a few.

As used herein, the term "substituted and unsubstituted carbocyclic" means cyclic carbon-containing compounds, including, but not limited to cyclopentyl, cyclohexyl, cycloheptyl, and the like. Such cyclic groups may also contain various substituents in which one or more hydrogen atoms have been replaced by a functional group. Such functional groups include those described above, and lower alkyl groups having from 1-28 carbon atoms. The cyclic groups of the invention may further comprise a heteroatom.

As mentioned above, $R_1$ and $R_2$ can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, and 2,2-methylphenylbutyl.

Non-grafted metallocene-catalyzed polymers useful in the present invention are commercially available under the trade name AFFINITY® polyolefin plastomers and ENGAGE® polyolefin elastomers from Dow and DuPont-Dow. Other metallocene-catalyzed polymers can be used, such as EXACT® from Exxon and INSIGHT® from Dow. The EXACT® and INSIGHT® line of polymers also have novel rheological behavior in addition to their other properties as a result of using a metallocene catalyst technology. Metallocene-catalyzed polymers are also readily available from Sentinel Products Corp. of Hyannis, Mass., as foamed sheets for compression molding.

Monomers useful in the present invention include, but are not limited to, olefinic monomers having, as a functional group, sulfonic acid, sulfonic acid derivatives, such as chlorosulfonic acid, vinyl ethers, vinyl esters, primary, secondary, and tertiary amines, mono-carboxylic acids, dicarboxylic acids, partially or fully ester-derivatized mono-carboxylic and dicarboxylic acids, anhydrides of dicarboxylic acids, and cyclic imides of dicarboxylic acids.

In addition, metallocene-catalyzed polymers may also be functionalized by sulfonation, carboxylation, or the addition of an amine or hydroxy group. Metallocene-catalyzed polymers functionalized by sulfonation, carboxylation, or the addition of a hydroxy group may be converted to anionic ionomers by treatment with a base. Similarly, metallocene-catalyzed polymers functionalized by the addition of an amine may be converted to cationic ionomers by treatment with an alkyl halide, acid, or acid derivative.

In one specific alternative embodiment, the monomer can be maleic anhydride, which, once attached to the metallocene-catalyzed polymer by the post-polymerization reaction, may be further subjected to a reaction to form a grafted metallocene-catalyzed polymer containing other pendant or functional groups. For example, reaction with water will convert the anhydride to a dicarboxylic acid; reaction with ammonia, alkyl, or aromatic amine forms an amide; reaction of the anhydride with an alcohol results in the formation of an ester; and reaction with a base results in the formation of an anionic ionomer.

The HNP's of the present invention may also be blended with single-site and metallocene catalysts and polymers formed therefrom. As used herein, the term "single-site catalyst," such as those disclosed in U.S. Pat. No. 6,150,462 which is incorporated herein by reference, refers to a catalyst that contains an ancillary ligand that influences the steric and electronic characteristics of the polymerizing site in a manner that prevents formation of secondary polymerizing species.

Olefinic block copolymers can also be used with the HNP materials and blends thereof described herein. Olefinic block copolymers include alternating blocks of rigid and highly elastomeric segments. Non-limiting examples of suitable olefinic block copolymers can include INFUSE olefin block copolymers (available from Dow) and the multi-block copolymers described in U.S. Patent Application Publication No. 2008/0146736, which is incorporated herein by reference. Table I below summarizes some relevant material properties of the olefinic block copolymers:

TABLE I

Properties of Dow Chemicals Infuse ® Olefinic Block Copolymer (OBC)

| | Units | Test method | INFUSE ® D9007.05 | INFUSE ® D9100.05 | INFUSE ® D9500.05 | INFUSE ® D9817.05 | INFUSE ® D9807.05 |
|---|---|---|---|---|---|---|---|
| Melt Index (190° C., 2.16-kg load) | g/10 min | ASTM D1238 | 0.5 | 1 | 5 | 15 | 15 |
| Density | g/cm$^3$ | ASTM D792 | 0.866 | 0.877 | 0.877 | 0.877 | 0.866 |
| Hardness | Shore A | ASTM D 2240 | 64 | 75 | 76 | 75 | 60 |
| Tensile Modulus, 100% Secant | psi | ASTM D 638 | 226 | 371 | 395 | 403 | 216 |
| Tensile Modulus, 300% Secant | psi | ASTM D 638 | 100 | 161 | 160 | 158 | 84 |

TABLE I-continued

| Properties of Dow Chemicals Infuse ® Olefinic Block Copolymer (OBC) | | | | | | | |
|---|---|---|---|---|---|---|---|
| | Units | Test method | INFUSE ® D9007.05 | INFUSE ® D9100.05 | INFUSE ® D9500.05 | INFUSE ® D9817.05 | INFUSE ® D9807.05 |
| Flexural Modulus, 2% Secant | psi | ASTM D 790 | 2,199 | 2,765 | 3,059 | 3,278 | 2,267 |
| Ultimate Tensile Strength | psi | ASTM D 638 | 2,260 | 2,510 | 844 | 614 | 241 |
| Ultimate Tensile Elongation | % | ASTM D 638 | 720 | 1,673 | 1,078 | 1,158 | 824 |
| Tear Strength | lb/in | ASTM D 1004 | 178 | 236 | 220 | 218 | 107 |
| Compression set @ 21° C. | % | ASTM D 395 | 17 | 17 | 23 | 16 | 15 |

The HNP materials of the present invention can further comprise or be blended with rosin-modified polymers, such as those described in U.S. Patent Application Publication No. 2008/0113829 which is incorporated herein by reference.

Engineering thermoplastic vulcanizates can also be advantageously used in connection with the HNP materials of the present invention. U.S. Pat. No. 7,399,239, which is incorporated herein by reference, describes engineering thermoplastic vulcanizates which are particularly suitable for use in golf balls, some of which are commercially available as DuPont ETPV® resins.

Similarly, bi-modal and soft, resilient polymers can also be used with the HNP materials of the present invention. Suitable bi-modal ionomers for use in the present invention are described in U.S. Pat. No. 7,037,967 which is incorporated herein by reference.

Various olefin/polar copolymers as disclosed in U.S. Pat. No. 7,479,531 can also be suitable for use in blends with the HNP materials of the present invention. In addition, the polar groups of such copolymers can be readily converted to ionic groups for use as the HNP material. For example, polar groups can be converted to ionic groups via a neutralization of acid groups in the presence of a sufficient amount of a suitable cation source or by the saponification of ester moieties using a suitable base.

Suitable olefin monomers can include linear, aromatic, non-aromatic cyclic, and diolefins. As used herein, a "polar monomer" refers to a monomer comprising carbon, hydrogen and at least one heteroatom, and having at least one unsaturation. Olefin monomers can generally include $C_{2-100}$ olefins, such as subsets $C_{2-60}$ olefins, $C_{2-40}$ olefins, $C_{2-20}$ olefins, and $C_{2-12}$ olefins. In some embodiments, olefin monomers can include linear, branched or cyclic alpha-olefins. Specific non-limiting examples of particularly suitable olefin monomers include one or more of ethylene, propylene, butene, pentene, hexene, heptene, octene, nonene, decene, undecene, dodecene, 4-methyl-pentene-1,3-methyl pentene-1,3,5,5-trimethyl-hexene-1, and 5-ethyl-1-nonene.

Suitable olefin monomers can also include aromatic-group-containing monomers containing up to 30 carbon atoms. Aromatic-group-containing monomers comprise at least one aromatic structure, typically from one to three, such as a phenyl, indenyl, fluorenyl, or naphthyl moiety. The aromatic-group-containing monomer can further comprise at least one polymerizable double bond such that after polymerization, the aromatic structure will be pendant from the polymer backbone. The aromatic-group containing monomer may further be substituted with one or more hydrocarbyl groups including but not limited to $C_{1-10}$ alkyl groups. Additionally two adjacent substitutions may be joined to form a ring structure. In one aspect, the aromatic-group-containing monomers contain at least one aromatic structure appended to a polymerizable olefinic moiety. In another aspect, aromatic monomers can include styrene, alpha-methylstyrene, para-alkylstyrenes, vinyltoluenes, vinylnaphthalene, allyl benzene, and indene, especially styrene, para-methylstyrene, 4-phenyl-1-butene, and allyl benzene.

Non-aromatic cyclic group containing monomers are also suitable for use as olefin monomers. These monomers can contain up to 30 carbon atoms. Suitable non-aromatic cyclic group containing monomers typically have at least one polymerizable olefinic group that is either pendant on the cyclic structure or is part of the cyclic structure. The cyclic structure may also be further substituted by one or more hydrocarbyl groups such as, but not limited to, $C_{1-10}$ alkyl groups. Specific examples of non-aromatic cyclic group containing monomers include vinylcyclohexane, vinylcyclopentane, cyclopentene, cyclohexene, cyclobutene, vinyladamantane and the like.

Typically, polar monomers can contain one or more of aluminum, boron, silicon, nitrogen, oxygen, sulfur, phosphorus, bromine, chlorine, iodine, fluorine, and the like. In one specific aspect, the heteroatom(s) can be nitrogen and or oxygen. The heteroatom may be attached directly to the double bond of the olefin monomer or cyclic monomer, or alternately may be attached to any other carbon atom(s). If desired, the heteroatom may comprise part of a ring structure. Example polar monomers include monomers containing one or more heteroatom containing groups, which are selected from the group consisting of: siloxy, silane, alcohol (hydroxy), dihydroxy, phenol, acetal, epoxide, carbonate, methyl ether, ethyl ether, propyl ether, butyl ether, isobutyl ether, sec-butyl ether, t-butyl ether, cyclohexyl ether, phenyl ether, benzyl ether, carboxylic acid, carboxylic salt, carboxylic anhydride, methyl ester, ethyl ester, propyl ester, isopropyl ester, butyl ester, isobutyl ester, sec-butyl ester, t-butyl ester, cyclohexyl ester, phenyl ester, benzyl ester, acetate, nitrile, imine, trimethylsilyl ether, di-t-butylmethylsilyl ether, trimethylsilane and other alkyl silanes, borane, alkyl boranes, aryl boranes, alanes, aluminates, carboxylic acid trimethylsilyl ether, carboxylic acid di-t-butylmethylsilyl ether, sulfonate, nitro, amine, amide, aldehyde, ketone, thiol, and sulfide. In some embodiments, the heteroatom containing group be selected from the group consisting of hydroxy, dihydroxy, acetal, trimethylsilyl ether, acetate, methyl ester, ethyl ester, and carbonate. In another embodiment the polar monomer comprises carbon monoxide.

As a general guideline, the olefin monomers are typically present in the polymer at 50 mole % to 99.9 mole %, often 70 to 98 mole %, and in some cases 80 to 95 mole %. In one embodiment, the polar monomers are present in the polymer at 0.1 mole % to 50 mole %, based upon the moles of all monomers present, such as 2 to 30 mole %, and in some cases 5 to 20 mole %. In another embodiment the polar monomer is present in the polymer at 0.2 to 15 mole % and the olefin monomer(s) is present at 99.8 to 85 mole %.

In another embodiment the olefin-polar copolymer (including terpolymers) produced herein is a copolymer of ethylene and/or propylene and one or more polar monomers. In one specific embodiment, the polar monomers are one or more linear alpha-vinyl, omega-polar monomers or cyclic polar monomers. In one specific embodiment, the olefin-polar copolymer is a copolymer of ethylene or propylene and one or more of 7-octen-1-ol, 7-octen-1-ol trimethylsilyl ether, octenyl acetate, 5-norbornen-2-yl acetate, 5-norbornen-2-ol, and 5-norbornen-2-ol trimethylsilyl ether.

Other secondary polymers can also be used in connection with the HNP materials of the present invention as separate and distinct layers or as part of blends with the HNP materials. Non-limiting examples of additional secondary polymers include polydimethylsiloxane ionomers, glass ionomers, butyl ionomers, cross-linked rubbers (e.g., MICROMORPH® from Rhein Chemie), nanocomposites, polyacrylates (e.g., VAMAC® ethylene acrylic elastomers), and interpenetrating polymer networks including those polymers described herein.

The HNP materials of the present invention may also be blended with polyurethane and polyurea ionomers which include anionic moieties or groups, such as those disclosed in U.S. Pat. Nos. 6,207,784 and 6,756,436 which are incorporated herein by reference.

Optional filler components can be chosen to impart additional density to blends of the previously described components, the selection being dependent upon the different parts (e.g., cover, mantle, core, center, intermediate layers in a multilayered core or ball) and the type of golf ball desired (e.g., one-piece, two-piece, three-piece or multiple-piece ball), as will be more fully detailed below.

Generally, the filler will be an inorganic material having a density greater than about 4 g/cm$^3$, and most often greater than 5 g/cm$^3$, and will be present in amounts between 0 to about 60 wt. % based on the total weight of the composition. Examples of useful fillers include zinc oxide, barium sulfate, lead silicate and tungsten carbide, as well as the other well-known fillers used in golf balls. Non-limiting examples of suitable organic or inorganic fillers can include density adjusting fillers such as metals, blowing agents, surface modifying agents, reinforced fillers, composites, nanoparticulates, foaming agents, stabilizers, and the like. Specific examples of such filler materials include starch, talc, calcium carbonate, glass fibers, polymeric fibers, metal fibers, flakes, expandable layered silicates, phosphates or carbonates such as clays, mica, silica, alumina, aluminosilicates, aluminophosphates, nanotubes, wollastonite, graphite, zeolites, and ceramics such as silicon carbide, silicon nitride, and titanias. It is desirable that the filler materials be non-reactive or almost non-reactive and not stiffen or raise the compression nor reduce the coefficient of restitution significantly.

Additional optional additives useful in the practice of the subject invention include acid copolymer wax (e.g., Allied wax AC 143 believed to be an ethylene/16-18% acrylic acid copolymer with a number average molecular weight of 2,040), which assist in preventing reaction between the filler materials (e.g., ZnO) and the acid moiety in the ethylene copolymer. Other optional additives include $TiO_2$, which is used as a whitening agent; optical brighteners; surfactants; processing aids; etc.

The resultant golf balls typically have a coefficient of restitution of greater than about 0.7, such as greater than about 0.75, and in some cases greater than about 0.78. The golf balls also typically have an Atti compression of at least about 40, such as from about 50 to 120, and in some cases from about 60 to 100 and preferably 90 to 105.

In addition to the HNP's neutralized with organic fatty acids and salts thereof, core compositions may comprise at least one rubber material having a resilience index of at least about 40. Typically, the resilience index is at least about 50. Polymers that produce resilient golf balls and, therefore, are suitable for the present invention, include but are not limited to CB23, CB22, from Lanxess of Texas, Neodene 40 from Marbochem of South Africa, and BR1208 from LG of Korea.

Additionally, the unvulcanized rubber, such as polybutadiene, in golf balls prepared according to the invention typically has a Mooney viscosity of between about 40 and about 80, such as between about 45 and about 65, and in some cases between about 45 and about 55. Mooney viscosity is typically measured according to ASTM-D1646.

When golf balls are prepared according to the invention, they typically will have dimple coverage greater than about 60 percent, such as greater than about 65 percent, and often greater than about 75 percent. The flexural modulus of the cover on the golf balls, as measured by ASTM method D6272-98, Procedure B, is typically greater than about 500 psi, and is usually from about 500 psi to 150,000 psi. As discussed herein, the outer cover layer can be formed from a relatively soft polyurethane or polyurea castable material. In particular, the material of the outer cover layer should have a material hardness, as measured by ASTM-D2240, less than about 45 Shore D, such as less than about 40 Shore D, more particularly between about 25 and about 40 Shore D, and in some cases between about 30 and about 40 Shore D. The casing can have a material hardness of less than about 70 Shore D, such as between about 30 and about 70 Shore D, and in some cases between about 50 and about 65 Shore D.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

In one embodiment, the core of the present invention has an Atti compression of between about 50 and about 90, such as between about 60 and about 85, and in some cases between about 65 and about 85. The overall outer diameter ("OD") of the core is less than about 1.590 inches, often no greater than 1.580 inches, and in some cases between about 1.540 inches and about 1.580 inches. In one specific embodiment, the OD of the core can be between about 1.525 inches to about 1.570 inches. The OD of the casing of the golf balls of the present invention is generally between 1.580 inches and about 1.640 inches, often between about 1.590 inches to about 1.630 inches, and in some cases between about 1.600 inches to about 1.630 inches.

The present multilayer golf ball can have an overall diameter of any size. Although the United States Golf Association specifications limit the minimum size of a competition golf ball to 1.680 inches. There is no specification as to the maximum diameter. Golf balls of any size, however, can be used for recreational play. In one specific embodiment, the diameter of the present golf balls can be from about 1.680 inches to about 1.800 inches. In other embodiments, the diameter can be from about 1.680 inches to about 1.760 inches. Currently, the most desirable diameter can be about 1.680 inches to about 1.740 inches.

The golf balls of the present invention may comprise a variety of constructions. In one embodiment of the present invention, golf ball includes a core, an inner cover layer surrounding the core, and an outer cover layer. Typically, the core is solid and is often a solid, single-layer core. In one embodiment, the solid core comprises the HNP's of the present invention. In an alternative embodiment, the solid core may include compositions having a base rubber, a crosslinking agent, a filler, and a co-crosslinking or initiator agent, and the inner cover layer comprises the HNP's of the present invention.

The base rubber typically includes natural or synthetic rubbers. One exemplary base rubber is 1,4-polybutadiene having a cis-structure of at least 40%. However, generally, the base rubber comprises a high-Mooney-viscosity rubber. If desired, the polybutadiene can also be mixed with other elastomers known in the art such as natural rubber, polyisoprene rubber and/or styrene-butadiene rubber in order to modify the properties of the core.

The crosslinking agent includes a metal salt of an unsaturated fatty acid such as a zinc salt or a magnesium salt of an unsaturated fatty acid having 3 to 8 carbon atoms such as acrylic or methacrylic acid. Suitable cross linking agents include metal salt diacrylates, dimethacrylates and monomethacrylates wherein the metal is magnesium, calcium, zinc, aluminum, sodium, lithium or nickel. The crosslinking agent is present in an amount from about 15 to about 30 parts per hundred of the rubber, such as from about 19 to about 25 parts per hundred of the rubber. In one embodiment, the core can include about 20 to 24 parts crosslinking agent per hundred of rubber. The core compositions of the present invention may also include at least one organic or inorganic cis-trans catalyst to convert a portion of the cis-isomer of polybutadiene to the trans-isomer, as desired.

The initiator agent can be any known polymerization initiator which decomposes during a cure cycle. Suitable initiators include peroxide compounds such as dicumyl peroxide, 1,1-di-(t-butylperoxy)3,3,5-trimethyl cyclohexane, a-a bis-(t-butylperoxy)diisopropylbenzene, 2,5-dimethyl-2,5 di-(t-butylperoxy)hexane or di-t-butyl peroxide and mixtures thereof.

Fillers can also be used and are any compound or composition that can be used to vary the density and other properties of the core. Typically fillers can include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like.

The golf ball cores of the present invention may also comprise a variety of alternative constructions. For example, the core may comprise a single layer or a plurality of layers. The core may also be formed of a tensioned elastomeric material.

In another embodiment of the present invention, the golf ball can comprise a solid center surrounded by at least one additional solid outer core layer. Such "dual" cores can be surrounded by a "double" cover comprising an inner cover layer and an outer cover layer.

In another embodiment, the inner cover layer comprises the highly-neutralized acid copolymers of the present invention. In an alternative embodiment, the outer core layer comprises the highly-neutralized acid copolymers of the present invention.

At least one of the outer core layers can be formed of a resilient rubber-based component comprising a high-Mooney-viscosity rubber, and a crosslinking agent present in an amount from about 20 to about 40 parts per hundred, from about 30 to about 38 parts per hundred, and in some cases about 37 parts per hundred. It should be understood that the term "parts per hundred" is with reference to the rubber by weight.

As an illustration of various constructions in accordance with the present invention, several additional optional designs are set forth in the following section. In each embodiment, a highly neutralized polymer is used in at least one of the layers with particular relationships of hardness, diameters, and/or percent neutralization. It will be understood that many of the identified components can also be used in other embodiments described herein.

The polyurethane cover of the present invention can include a polyisocyanate, a polyol, and at least one curing agent as disclosed in the U.S. Pat. No. 6,756,436. The polyisocyanate can include 4,4'-diphenylmethane diisocyanate; polymeric 4,4'-diphenylmethane diisocyanate; carbodiimide-modified liquid 4,4'-diphenylmethane diisocyanate; 4,4'-dicyclohexylmethane diisocyanate; p-phenylene diisocyanate; m-phenylene diisocyanate; toluene diisocyanate; 3,3'-dimethyl-4,4'-biphenylene diisocyanate; isophoronediisocyanate; hexamethylene diisocyanate; naphthalene diisocyanate; xylene diisocyanate; p-tetramethylxylene diisocyanate; m-tetramethylxylene diisocyanate; ethylene diisocyanate; propylene-1,2-diisocyanate; tetramethylene-1,4-diisocyanate; cyclohexyl diisocyanate; 1,6-hexamethylene-diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of hexamethylene-diisocyanate; triisocyanate of 2,4,4-trimethyl-1,6-hexane diisocyanate; tetracene diisocyanate; napthalene diisocyanate; anthracene diisocyanate; isocyanurate of toluene diisocyanate; uretdione of hexamethylene diisocyanate; di-isocyanates, tri-isocyanates, or tetra-isocyanates. In one aspect of the present invention, the polyisocyanate includes less than about 0.1% free monomer groups or the polyisocyanate comprises less than about 7.5% unreacted NCO groups.

The polyol can include polyether polyols, fully-hydrogenated hydroxy-terminated polybutadiene; partially-hydrogenated hydroxy-terminated polybutadiene; polyester polyols; polycaprolactone polyols; or polycarbonate polyols and the curing agent includes diols, triols, tetraols, hydroxy-terminated curatives, or polyamines.

The polyamine can include 3,5-dimethylthio-2,4-toluenediamine and isomers thereof; 3,5-diethyltoluene-2,4-diamine and isomers thereof; 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline; m-phenylenediamine; 4,4'-methylene-bis-(2-chloroaniline); 4,4'-methylene-bis-(2,6-diethylaniline); 4,4'-methylene-bis-(2,3-dichloroaniline); 4,4'-diamino-3,3'-diethyl-5,5'-dimethyl diphenylmethane; 2,2', 3,3'-tetrachloro diamino diphenylmethane; or trimethylene glycol di-p-aminobenzoate.

The polyurea cover composition as disclosed in the U.S. Pat. No. 6,958,679 can also be used in the present invention. The polyurea is formed from a prepolymer includes a polyisocyanate and a polyamine, and at least one polyamine curing agent. At least one of the polyamine in the prepolymer or the polyamine curing agent can include polyether amines; methyldiethanolamine; polyoxyalkylenediamines; polytetramethylene ether diamines; polyoxypropylenetriamine; polyoxypropylene diamines; poly(ethylene oxide capped oxypropylene)ether diamines; propylene oxide-based triamines; triethyleneglycoldiamines; trimethylolpropane-based triamines; glycerin-based triamines; ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; dipropylene triamine; imido-bis-propylamine; monoethanolamine, diethanolamine; triethanolamine; monoisopropanolamine, diisopropanolamine; isophoronediamine; 4,4'-methylenebis-(2-chloroaniline); 3,5;dimethylthio-2,4-toluenediamine; 3,5-dimethylthio-2,6-toluenediamine; 3,5-diethylthio-2,4-toluenediamine; 3,5;diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; N,N,N',N'-tetrakis(2-hydroxypropyl)ethylene diamine; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); m-phenylenediamine; or p-phenylenediamine. In one embodiment, the polyamine curing agent includes a hindered secondary diamine.

At least one of the polyamine in the prepolymer or the polyamine curing agent has a molecular weight of between about 100 and about 5000. In one embodiment, the blend includes one or more saturated, unsaturated, aromatic, or cyclic groups.

The core can optionally further include a second polymer component including ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers, or cationic ionomers, and wherein the second polymer component has a Shore D hardness less than the first hardness and is present in an amount sufficient to reduce the core compression to less than or equal to about 70.

In still another embodiment, the core has a diameter of about 1.58 inches or greater. In some embodiments, the core can include two or more layers. Additionally, the cover may be cast or reaction injection molded, injection molded, or compression molded over the core. The cover may also include an inner cover layer and an outer cover layer. In one embodiment, the inner cover layer has material hardness of at least about 60 Shore D and the outer cover layer has a material hardness of no greater than about 60 Shore D. In another embodiment, the outer cover layer has material hardness of at least about 60 Shore D and the inner cover layer has a material hardness of no greater than about 60 Shore D.

The cover comprises an inner cover layer and an outer cover layer. In one embodiment, the inner cover layer has a material hardness of at least about 60 Shore D and the outer cover layer has a material hardness of no greater than about 60 Shore D. In another embodiment, the outer cover layer has material hardness of at least about 60 Shore D and the inner cover layer has a material hardness of no greater than about 60 Shore D. The core can include a solid center and an outer core layer, the solid center including the polymer. Alternatively, the core includes a solid center and an outer core layer, the outer core layer comprising the polymer.

When the golf ball of the present invention includes an intermediate layer, such as an outer core layer or an inner cover layer, any or all of these layer(s) may comprise thermoplastic and thermosetting material. Typically, the intermediate layer(s), if present, can comprise any suitable material, such as ionic copolymers of ethylene and an unsaturated monocarboxylic acid which are available under the trademark SURLYN® from DuPont or IOTEK® or ESCOR® of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

This golf ball can likewise include one or more homopolymeric or copolymeric inner or outer cover materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates, in particular PPDI-based thermoplastic polyurethanes, and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN® polyethylene, ethylene copolymers, ethylene-propylene-non-conjugated diene terpolymer, and the like;

(6) Acrylic resins and blends of these resins with poly vinyl chloride, elastomers, and the like;

(7) Thermoplastics, such as urethane; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX®, sold by ELF Atochem;

(8) Polyphenylene oxide resins or blends of polyphenylene oxide with high impact polystyrene as sold under the trademark NORYL® by GE;

(9) Thermoplastic polyesters, such as polyethylene terephthalate, polybutylene terephthalate, polyethylene terephthalate/glycol modified, poly(trimethylene terepthalate), and elastomers sold under the trademarks HYTREL® from DuPont, and LOMOD® from GE;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

Highly-neutralized thermoplastics blend of the invention used in the golf ball layer can be made by: (a) melt-blending (1) ethylene, α,β-ethylenically unsaturated $C_{3-8}$ carboxylic acid copolymer(s) or melt-processible ionomer(s) thereof that have their crystallinity disrupted by addition of a softening monomer or other means with (2) sufficient non-volatile, non-migratory agents to substantially remove the remaining ethylene crystallinity, and then concurrently or subsequently (b) adding a sufficient amount of a cation source to increase the level of neutralization of all the acid moieties (including those in the acid copolymer and in the organic acid if the non-volatile, non-migratory agent is an organic acid) such that the acid content in the acid copolymer is neutralized to greater than 90%, often near 100%, and in some cases to 100%; or (c) adding a sufficient amount of a grafted metallocene catalyzed polymer such as a FUSABOND® 525D or an olefinic block copolymer INFUSE® like in Tables II and III.

TABLE II

Prophetic Examples: A golf ball core layer composition based on a highly neutralized polymer and a metallocene catalyzed polymer.

| | Ex. 1 (parts) | Ex. 2 parts) | Ex. 3 parts) | Ex. 4 (parts) | Ex. 5 (parts) | Ex. 6 (parts) | Ex. 7 (parts) | Ex. 8 (parts) | Ex. 9 (parts) |
|---|---|---|---|---|---|---|---|---|---|
| NUCREL ® 960[1] | 100 | 100 | 100 | 100 | 100 | 100 | 100 | 100 | 100 |
| FUSABOND ® NMO 525D[2] | 15 | 30 | 45 | 15 | 30 | 45 | 15 | 30 | 45 |
| Li(OH) monohydrate | 6.99 | 6.99 | 6.99 | 6.99 | 6.99 | 6.99 | 8.73 | 8.73 | 8.73 |
| zinc stearate | 40 | 40 | 40 | 70 | 70 | 70 | 70 | 70 | 70 |

[1]NUCREL ® 960 is a copolymer of ethylene with 15% methacrylic acid from DuPont

[2]FUSABOND ® NMO 525D is a maleic anhydride grafted onto a metallocene catalyzed ethylene-butene copolymer from DuPont Canada

TABLE III

Prophetic Examples: A golf ball core layer composition based on a highly neutralized polymer and a metallocene catalyzed and an olefinic block copolymer.

| | Ex. 10 (parts) | Ex. 11 (parts) | Ex. 12 (parts) | Ex. 13 (parts) | Ex. 14 (parts) | Ex. 15 (parts) | Ex. 16 (parts) | Ex. 17 (parts) | Ex. 18 (parts) |
|---|---|---|---|---|---|---|---|---|---|
| NUCREL ® 960 | 100 | 100 | 100 | 100 | 100 | 100 | 100 | 100 | 100 |
| FUSABOND ® NMO 525D | 10 | 20 | 25 | 10 | 20 | 25 | 10 | 20 | 25 |
| INFUSE ® D9500.05[3] | 5 | 10 | 20 | 5 | 10 | 20 | 5 | 10 | 20 |
| Li(OH) monohydrate | 6.99 | 6.99 | 6.99 | 6.99 | 6.99 | 6.99 | 8.73 | 8.73 | 8.73 |
| zinc stearate | 40 | 40 | 40 | 70 | 70 | 70 | 70 | 70 | 70 |

[3]INFUSE ® D9500.05 is an olefinic block copolymer from Dow

In another embodiment of the present invention, the highly-neutralized thermoplastics blend of the invention used in the golf ball layer can also be made by melt-blending a previously made highly neutralized ionomer such as HPF® 1000 with a varying amount of a grafted metallocene catalyzed polymer such as FUSABOND 525D® and an olefinic block copolymer INFUSE® like in Table IV below:

TABLE IV

Prophetic Examples: A golf ball layer composition based on a highly neutralized polymer and a metallocene catalyzed polymer.

| | Ex. 1 (parts) | Ex. 2 parts) | Ex. 3 parts) | Ex. 4 (parts) | Ex. 5 (parts) | Ex. 6 (parts) | Ex. 7 (parts) |
|---|---|---|---|---|---|---|---|
| HPF ® 1000[4] | 100 | 90 | 80 | 70 | 90 | 80 | 70 |
| FUSABOND ® NMO 525D | | 10 | 20 | 30 | 5 | 10 | 15 |

TABLE IV-continued

Prophetic Examples: A golf ball layer composition based on a highly neutralized polymer and a metallocene catalyzed polymer.

| | Ex. 1 (parts) | Ex. 2 parts) | Ex. 3 parts) | Ex. 4 (parts) | Ex. 5 (parts) | Ex. 6 (parts) | Ex. 7 (parts) |
|---|---|---|---|---|---|---|---|
| INFUSE ® D9500.05 | — | — | — | — | 5 | 10 | 15 |
| zinc stearate | 40 | 40 | 40 | 40 | 70 | 70 | 70 |

[4]HPF ® 1000 is a highly neutralized ter-polymer from DuPont

In another embodiment of the present invention wherein the inventive composition has a water vapor transmission rate (WVTR) of at least 0.01, preferably 0.04 to 2.9, more preferably 0.045 to 1.0 g·mm/m$^2$·day using an ASTM F1249-90 method.

In one embodiment for a three piece golf ball, the core surface hardness of at least 83 JIS C or 52 Shore D, a casing surface hardness measured on the ball at least 90 JIS C or 91 Shore C or 62 Shore D, a 10 days aged button hardness for the casing layer of at least 90 JIS C or 60 Shore D, a ball cover hardness of at least 81 JIS C or 82 Shore C or 59 Shore D and a 10 days aged button hardness for the cover layer of at least 72 JIS C or 72 Shore C or 47 Shore D.

In another embodiment for a four piece golf ball, the inner core surface hardness of at least 76 JIS C or 43 Shore D, an outer core surface hardness measured on the ball at least 89 JIS C or 60 Shore D, a casing surface hardness measured on the ball at least 93 JIS C or 92 Shore C or 61 Shore D, a 10 days aged button hardness for the casing layer of at least 90 JIS C or 60 Shore D, a ball cover hardness of at least 81 JIS C or 82 Shore C or 59 Shore D and a 10 days aged button hardness for the cover layer of at least 72 JIS C or 72 Shore C or 47 Shore D.

In another embodiment for a three cover golf ball, the inner core surface hardness of at least 83 Shore C or 45 Shore D, an innermost cover layer has a surface hardness measured on the ball at least 90 Shore C or 60 Shore D, an intermediate layer has a surface hardness measured on the ball at least 93 Shore C or 62 Shore D, a 10 days aged button hardness for the casing layer of at least 65 Shore D, a ball cover hardness of at least 80 Shore C or 59 Shore D and a 10 days aged button hardness for the cover layer of at least 72 JIS C or 72 Shore C or 47 Shore D.

In another embodiment for a dual core and a single cover golf ball, the core surface hardness of at least 74 JIS C or 40 Shore D, an outer core surface hardness measured on the ball at least 85 JIS C or 55 Shore D, a ball cover hardness of at least 55 Shore D and a 10 days aged button hardness for the cover layer of at least 56 Shore D.

In another embodiment for a single core and a single cover golf ball, the core surface hardness of at least 78 JIS C or 44 Shore D, a ball cover hardness of at least 63 Shore D and a 10 days aged button hardness for the cover layer of at least 64 Shore D.

These materials are examples of exemplary center and/or core layer compositions of the present invention. However, these materials may also be used as a cover layer herein.

As used herein, the term "about," used in connection with one or more numbers or numerical ranges, should be understood to refer to all such numbers, including all numbers in a range. Further, the singular forms "a," "an," and "the" include plural referents unless the context clearly dictates otherwise. Thus, for example, reference to "a layer" includes reference to one or more of such structures and reference to "molding" refers to one or more such steps.

Other than in the operating examples, or unless otherwise expressly specified, all of the numerical ranges, amounts, values and percentages such as those for amounts of materials, and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. For example, the cations listed in connection with various fatty acid salts can result in substantially different affects on percentage neutralization allowed before processability is compromised.

The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising:

a core having a diameter of about 0.5 to 1.620 inches and an Atti compression no greater than about 105;

a cover layer having a material hardness between about 30 and 70 Shore D; and an optional intermediate layer disposed between the core and the cover layer, wherein one or more of the core, the cover layer, or the intermediate layer comprises a highly-neutralized polymer blend formed from a reaction product of an acid copolymer, a metallocene-catalyzed copolymer, an olefinic block copolymer, a fatty acid or salt of a fatty acid, and a sufficient amount of a suitable cation source to neutralize the total acid content in the acid copolymer to 80% to 100%.

2. The golf ball of claim 1, wherein the acid copolymer is an α-olefin, $C_{3-8}$ α,β-ethylenically unsaturated carboxylic acid.

3. The golf ball of claim 1, wherein the acid copolymer is an E/X/Y copolymer where E is ethylene, X is the $C_{3-8}$ α,β-ethylenically unsaturated carboxylic acid, and Y is a softening comonomer.

4. The golf ball of claim 3, wherein X is acrylic acid or methacrylic acid and Y is a $C_{1-8}$ alkyl acrylate or methacrylic ester.

5. The golf ball of claim 1, wherein the metallocene-catalyzed copolymer is a copolymer of ethylene and a second olefin.

6. The golf ball of claim 5, wherein the second olefin is propylene, butene, pentene, hexene, heptene, octene, or norbornene.

7. The golf ball of claim 6, wherein the metallocene-catalyzed copolymer is a grafted metallocene-catalyzed copolymer having pendant functional groups.

8. The golf ball of claim 7, wherein the pendant functional groups are selected from the group consisting of maleic, fumaric, acrylic, acrylate, and combinations thereof.

9. The golf ball of claim 1, wherein the fatty acid comprises caproic acid, caprylic acid, capric acid, lauric acid, stearic acid, behenic acid, erucic acid, oleic acid, linoleic acid, or dimerized derivatives thereof.

10. The golf ball of claim 9, wherein the fatty acid salt comprises magnesium oleate or zinc stearate.

11. The golf ball of claim 1, wherein the salt of the fatty acid comprises a cation selected from the group consisting of barium, lithium, sodium, zinc, bismuth, chromium, cobalt, copper, potassium, strontium, titanium, tungsten, magnesium, cesium, iron, nickel, silver, aluminum, tin, and calcium.

12. The golf ball of claim 1, wherein at least one of the core, the cover layer, and the intermediate layer includes the highly-neutralized polymer blend which is 100% neutralized.

13. The golf ball of claim 1, wherein the highly-neutralized polymer blend is neutralized from about 90% to 100%.

14. The golf ball of claim 1, wherein the core comprises a base rubber and the intermediate layer is an outer core layer comprising the highly-neutralized polymer blend.

15. The golf ball of claim 1, wherein the core comprises the highly-neutralized polymer blend.

16. The golf ball of claim 1, wherein the cover layer comprises a castable reactive liquid material comprising a polyurethane, a polyurea, or a copolymer comprising urethane and urea segments.

17. The golf ball of claim 1, wherein the cover layer comprises an inner cover layer and an outer cover layer.

* * * * *